March 10, 1931.  A. WILSON  1,795,691
COMBINED OPHTHALMOSCOPE, RETINOSCOPE, AND SLIT LAMP
Filed July 30, 1928  2 Sheets-Sheet 1
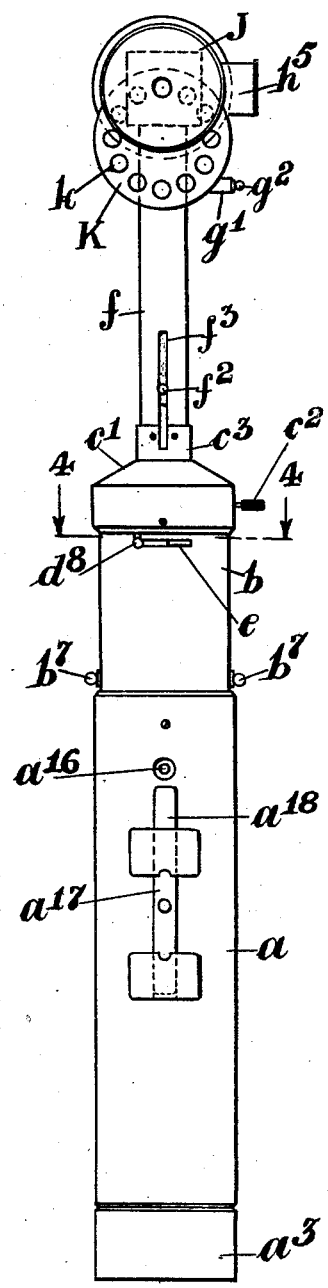
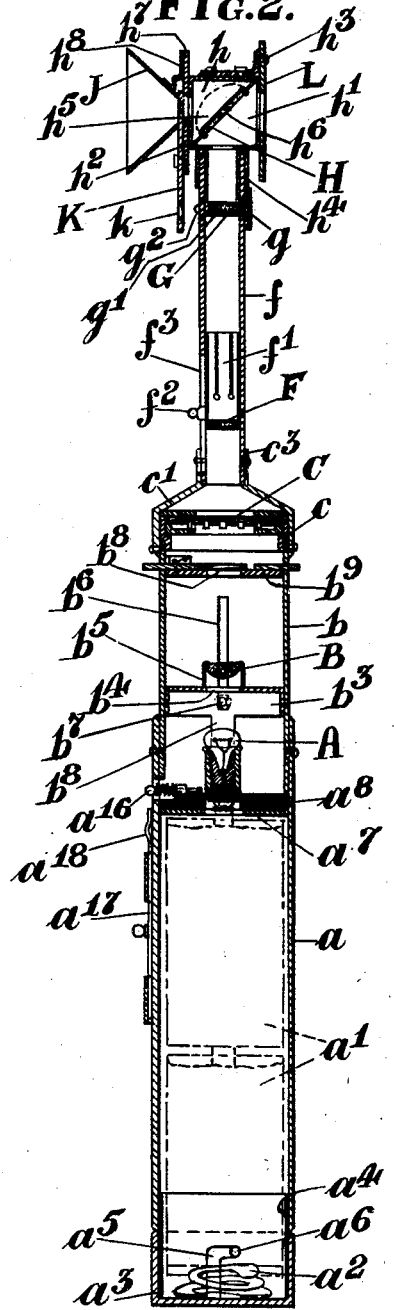
INVENTOR:
Arthur Wilson
by Monroe E. Miller
Attorney.

March 10, 1931.  A. WILSON  1,795,691
COMBINED OPHTHALMOSCOPE, RETINOSCOPE, AND SLIT LAMP
Filed July 30, 1928  2 Sheets-Sheet 2
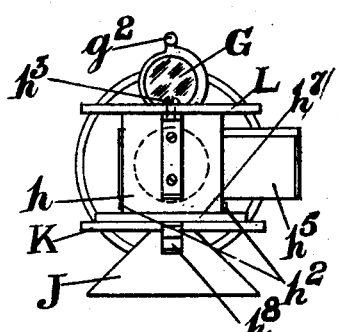
FIG.3.
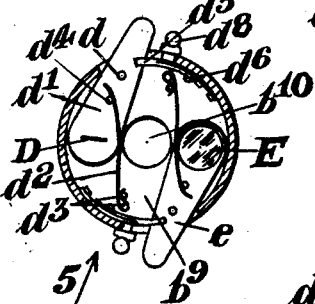
FIG.4.
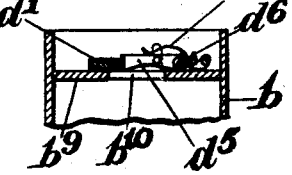
FIG.5.
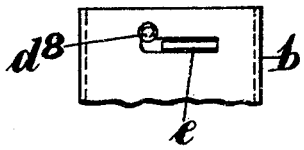
FIG.6.
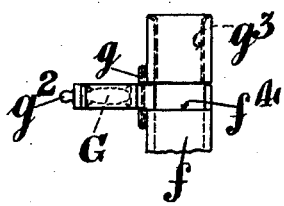
FIG.7.
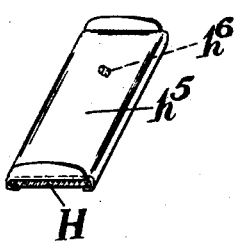
FIG.8.
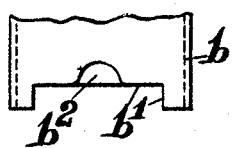
FIG.9.
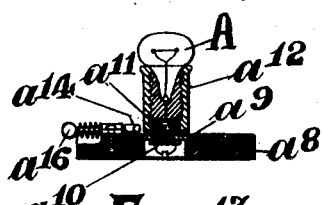
FIG.10.  FIG.12.  FIG.11.
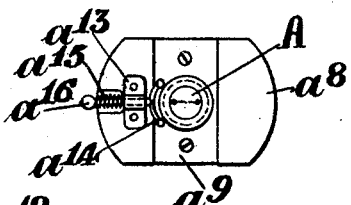
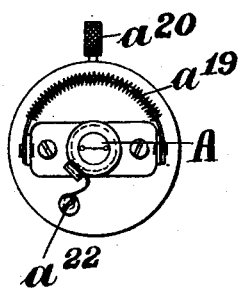
FIG.13.
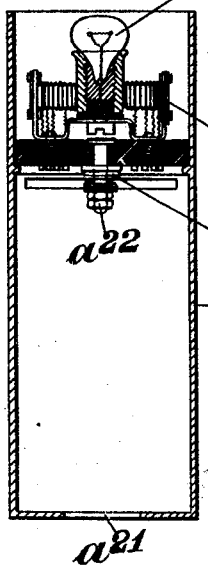
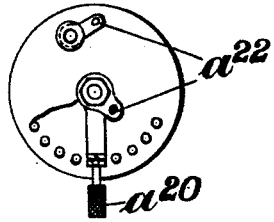
FIG.14.
INVENTOR:
Arthur Wilson
by Thomas E. Miller
Attorney.

Patented Mar. 10, 1931

1,795,691

UNITED STATES PATENT OFFICE

ARTHUR WILSON, OF WYKE, BRADFORD, ENGLAND

COMBINED OPHTHALMOSCOPE, RETINOSCOPE, AND SLIT-LAMP

Application filed July 30, 1928, Serial No. 296,389, and in Great Britain April 4, 1928.

This invention relates to an ophthalmoscope and has for its chief object to introduce an improved construction of instrument which will illuminate the interior of the eye perfectly and evenly so as to enable the user to obtain a perfect view of the fundus and media with monochromatic or red free light, the refractive error of an eye to be determined, the anterior portion of the eye and lids to be examined minutely, diseases of the fundus, maculæ, optic disc, cyrstalline lens, iris, cornea, conjunctiva, lids and other parts of the eye to be detected, the instrument being so constructed that it can be manipulated with ease and reliability and without inconveniencing the patient, or causing any ill after effects.

According to this invention the instrument comprises in combination an ophthalmoscope with monochromatic and red free light, with a variable aperture, a luminous plane and concave retinoscope, and a hand slit-lamp. The luminous ophthalmoscope is used for examining the interior of a human eye, i. e., the fundus, and media. The luminous retinoscope is used for obtaining objectively the refractive condition of an eye. The hand slit-lamp is used for examining the anterior portion of a human eye, i. e. the cornea, iris, sclera, lids and the like.

For the purpose of this invention light from a straight filament lamp passes through a condenser lens, through the aperture in an iris diaphragm and through a fine slit, or color filter, or neither, through a lens which together with the condenser lens are capable of adjustment for focusing purposes, to a mirror, or through an additional lens to the mirror, from which it is reflected into the observed eye.

When the instrument is used as a luminous ophthalmoscope and a concave retinoscope, the additional lens is in use, when used as a slit lamp, and a plane retinoscope, the additional lens is out of use.

In the accompanying drawings:—

Fig. 1 is an elevation, and Fig. 2 a section of an ophthalmoscope constructed in accordance with this invention and adapted to contain one or more dry cells for illuminating purposes.

Fig. 3 is a plan of the ophthalmoscope.

Fig. 4 is a section taken on line 4—4 of Fig. 1.

Fig. 5 is a section through part of the apparatus looking in the direction of the arrow 5 in Fig. 4.

Fig. 6 is an elevation of part of the apparatus shown in Figs. 4 and 5.

Fig. 7 is a detached view of part of the apparatus shewing the additional lens in its inoperative position.

Fig. 8 is a perspective view of the mirror.

Fig. 9 is a detached view of part of the casing hereinafter referred to.

Fig. 10 is a section shewing the lamp holder and its mounting.

Fig. 11 is a plan of the lamp holder and mounting.

Fig. 12 is a section of the lighting part of the apparatus for use with an accumulator or mains.

Fig. 13 is a plan of the lighting apparatus as shown in Fig. 12, and

Fig. 14 is a view of the underside of the lighting apparatus shown in Fig. 13.

A indicates the straight filament lamp, B the condenser lens, C the iris diaphragm, D the slit, E the color filter, F the focussing lens, G the additional lens and H the mirror.

Referring to Figs. 1 and 2, $a$ indicates a tubular casing adapted to contain one or more dry cells $a^1$ which are retained in position by a spring $a^2$ in a cap $a^3$ which fits over a liner $a^4$ fixed in the casing $a$. This liner has oppositely arranged bayonet slots $a^5$ for engagement with pins $a^6$ which project internally from the cap $a^3$. Fixed in the upper part of the casing A is a plate $a^7$ for supporting an ebonite or other insulating base $a^8$ to which is secured a metal plate $a^9$. Fixed to this metal plate by a screw $a^{10}$ is an insulating boss $a^{11}$ on to which is fixed a lamp holder $a^{12}$ for the reception of the straight filament lamp A which makes an electrical connection with the screw $a^{10}$, the latter making contact with the usual contact appertaining to the dry cell $a^1$. Slidably mounted in a clip $a^{13}$ is a contact $a^{14}$ which is normally kept out of contact with the lamp holder $a^{11}$ by a spring $a^{15}$ encircling a rod which terminates in a knob $a^{16}$. Slidably mounted on the casing $a$ is a contact member $a^{17}$ having a recessed portion $a^{18}$ adapted to be slid over the knob $a^{16}$ for retaining the contact $a^{14}$ against the lamp holder $a^{11}$. Detachably connected with the casing $a$ is an intermediate casing $b$ which is recessed at $b^1$ as shown in Fig. 9 to fit over the insulating base $a^8$ and is formed at one side with an opening $b^2$ for the passage of the knob $a^{16}$. Slidably mounted in the casing $b$ is a platform $b^3$ formed with a central aperture $b^4$ and a tubular extension $b^5$ in which the condenser lens B is mounted. The casing $b$ is formed with two oppositely disposed slots $b^6$ through which pass studs or pins $b^7$ by means of which the platform with the condenser lens can be raised and lowered. The platform $b^3$ is formed with depending legs $b^8$ which cover the slots $b^6$ when it is in its raised position and act as a light trap. Fixed near the upper end of the casing $b$ is a platform $b^9$ having a central aperture $b^{10}$. Pivotally mounted on the platform $b^9$ at $d$ is a lever $d^1$ formed at its inner end with the fine slit D. The outer end of this lever projects through an opening in the casing $b$ and it is normally retained in the inoperative position shown in Fig. 4 by a spring $d^2$ fixed at one end around pins $d^3$ on the platform $b^9$ and bearing at its other end against a pin $d^4$ on the lever $d^1$. When the lever is in this position a latch $d^5$ which is pivoted at $d^6$ to the casing $b$ rests on the top of the lever as shown in Fig. 4. When the lever is actuated to bring the slot D over the aperture $b^{10}$ the outer end of the lever moves clear of the end of the latch $d^5$ whereupon a spring $d^7$ forces the latch down to the position shown in Fig. 5 and locks the lever $d^1$ with the fine slit D. To put the fine slit D out of operation the latch $d^5$ is raised by a knob $d^8$ whereupon the spring $d^2$ returns the lever $d^1$ to the position shown in Fig. 4. The color filter E mounted at the inner end of the lever $e$ is constructed and actuated in the same manner as that described with reference to the lever $d^1$. Situated at the top of the casing $b$ is the iris diaphragm C. In the example shown this diaphragm is mounted in a cup ring $c$ that fits in the top of the casing $b$ and is retained in position by a conical cap $c^1$ and actuated to vary the aperture of the diaphragm by the lever $c^2$. The cap $c^1$ is detachably connected to the casing $b$ and terminates at its upper end in a socket $c^3$ into which a tubular casing $f$ is fixed. Slidably mounted in the casing $f$ is a spring liner $f^1$ carrying the focusing lens F which can be moved up and down by a knob $f^2$ projecting through a slot $f^3$ in the casing $f$. Hinged to the tube $f$ at $g$ is a lens holder $g^1$ carrying the additional lens G. The lens holder is constructed as shown at Fig. 3 and provided with a knob $g^2$ and the casing $f$ is cut half way through at $f^4$ as shown at Fig. 7 to receive the lens holder and allow the lens G to occupy the position shown in Fig. 2, the lens being moved to its inoperative position by the knob $g^2$. To prevent access of light through the cut away portion $f^4$ when the lens G is in its operative position a sleeve $g^3$ is mounted in the tube $f$ in such a manner that its lower edge contacts with the lens holder when the latter is in its operative position. Rotatably mounted on the top of the casing $f$ is a cubical head formed in two portions $h$, $h^1$, hinged together at $h^2$ and secured in their closed position by a screw $h^3$. The portion $h^1$ is formed with a socket $h^4$ which fits round the top of the casing $f$ and allows the cubical head to be rotated thereon. Slidably mounted in the two portions of the cubical head $h$, $h^1$ is a holder $h^5$ carrying the mirror H. Extending through the mirror H and holder $h^5$ is an aperture $h^6$ which is central with the axis of the casing $f$ and with the axis appertaining to an eyepiece J, and such aperture is made less in diameter than the thickness of the mirror. Fixed to the cubical head portion $h$ is a disc $h^7$ to which is secured an eyepiece J by a bracket $h^8$ and rotatably mounted on the disc $h^7$ is a disc K carrying a number of lenses $k$ any one of which can be brought into line with the aperture of the eyepiece J. Fixed to the cubical head portion $h^1$ is a disc L. In the construction shown in Figs. 12 to 14 which is applicable for use with an accumulator or mains, the straight filament lamp A is electrically connected with a rheostat $a^{19}$ controlled by a switch arm $a^{20}$, the electrical connections from the accumulator or mains passing through an aperture $a^{21}$ in the bottom of the casing $a$ and being connected with terminals $a^{22}$.

What I claim as my invention and desire to secure by Letters Patent is the United States is:—

1. An instrument of the character described comprising a tubular casing, an apertured mirror mounted at an angle at one end of the casing, a source of light for directing light to said mirror, a condenser lens adjustably mounted in the casing near the source of light, a platform in the casing in front of the condenser lens, and a pair of arms pivoted on said platform and operable from the exterior of the casing, one arm having a slit and the other arm having a color filter to be moved into the stream of light between said source and mirror, a focusing lens situated in front of the platform, a device for regulating the size of an aperture between the condenser lens and the focusing lens, an additional lens situated between the focusing lens and the mirror and means for moving such additional lens to an operative or inoperative position.

2. An instrument according to the preceding claim, including springs for moving said arms away from said stream of light, and latches for holding said arms in the stream of light and operable from the exterior of the casing.

3. An instrument of the character described comprising a tubular casing, a head rotatably mounted on one end of the casing and comprising hingedly connected portions one of which is rotatably connected to the casing, an eyepiece connected to the other portion, a source of light in the casing, lenses in the casing for directing the light into said head, and an apertured mirror for reflecting the light slidably mounted between said portions.

4. An instrument of the character described comprising a tubular casing, a head divided diagonally into two portions, one of said portions being rotatably connected to one end of the casing, an eyepiece carried by the other portion, an apertured mirror slidably mounted between said portions, a source of light in the casing, and lenses for directing the light to said mirror.

In testimony whereof I hereunto affix my signature.

ARTHUR WILSON.